United States Patent
Li et al.

(10) Patent No.: US 6,697,577 B1
(45) Date of Patent: Feb. 24, 2004

(54) METHOD AND APPARATUS FOR IN-SERVICE OPTIMIZATION OF THE PERFORMANCE OF AN OPTICAL TRANSMISSION SYSTEM

(75) Inventors: Jinghui Li, Nepean (CA); Hugues Tournier, Gatineau (CA); Joel Milgram, Deep River (CA); Suet Yuen, Kanata (CA); LeRoy Pick, Nepean (CA); Stephen Roberts, Paignton (GB); Bernard Thiboutot, Hull (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/431,165

(22) Filed: Nov. 1, 1999

(51) Int. Cl.[7] .............................................. H04B 10/06
(52) U.S. Cl. ......................... 398/202; 398/9; 398/147; 398/141; 398/79; 398/214; 398/91; 398/177; 398/178
(58) Field of Search .......................... 398/9, 147, 141, 398/79, 202, 214, 91, 177, 178

(56) References Cited

U.S. PATENT DOCUMENTS

| | | | | |
|---|---|---|---|---|
| 5,585,954 A | * | 12/1996 | Taga et al. .................. | 359/158 |
| 6,008,916 A | * | 12/1999 | Khaleghi .................... | 359/110 |
| 6,215,565 B1 | * | 4/2001 | Davis et al. ................ | 359/110 |
| 6,219,162 B1 | * | 4/2001 | Barnard et al. ............. | 359/124 |
| 6,229,631 B1 | * | 5/2001 | Sato et al. .................. | 359/110 |
| 6,351,322 B1 | * | 2/2002 | Ransford et al. ........... | 359/110 |
| 6,404,520 B1 | * | 6/2002 | Robinson et al. ........... | 359/110 |

OTHER PUBLICATIONS

Neal S. Bergano, F.W. Kerfoot and C.R. Davidson; "Margin Measurements in Optical Amplifier Systems", IEEE Photonics Technology Letters, Vol 5, No. 3, Mar. 1993, pp 304 to 306.

P. Palacharia, J. Chrostowski, R. Neumann, Institute for Information Technology, "Techniques for Accelerated Measurement of Low Bit Error Rates in Computer Data Links", 1995 IEEE, PP 184 to 190.

* cited by examiner

Primary Examiner—Leslie Pascal
Assistant Examiner—Hanh Phan

(57) ABSTRACT

A tuning system for use in a receiver of an optical transmission system. The receiver includes a data channel transporting a data signal and a monitoring channel transporting a copy of the data signal. The tuning system includes a processing module for processing the copy of the data signal to generate a control signal conveying tuning information. This tuning information is used by the receiver to alter an operating point of the receiver on the data channel. The operating point of the receiver that is susceptible to be altered by the control signal is a decision threshold applied on the data signal to discriminate one binary value from another binary value on the data channel of the receiver. This approach allows, when required or desired, tuning of the system while the system is in service. This is possible since the tuning of the system is performed using the monitoring channel, and does not disturb nor corrupt the actual data being transported on the data channel.

21 Claims, 9 Drawing Sheets

METHOD AND APPARATUS FOR IN-SERVICE OPTIMIZATION OF THE PERFORMANCE OF AN OPTICAL TRANSMISSION SYSTEM

FIELD OF THE INVENTION

The present invention relates to the field of data transmission, particularly with respect to fiber optic transmission systems, such as Dense Wavelength Division Multiplexing (DWDM) systems.

BACKGROUND OF THE INVENTION

Wavelength Division Multiplexing (WDM) is a fiber-optic transmission technique that uses optical wavelengths to transmit multiple channels of data and/or analog signals. Within optical networks, WDM allows the transmission over the optical layer of e-mail, video and multimedia, carried as Internet Protocol (IP) data over Asynchronous Transfer Mode (ATM), and voice, carried over Synchronous Optical Networks/Synchronous Digital Hierarchy (SONET/SDH). Despite the fact that these formats—IP, ATM and SONET/SDH—provide unique bandwidth management capabilities, all three can be transported over the optical layer using WDM. A particular example of WDM is Dense Wavelength Division Multiplexing (DWDM), offering greater capacity in terms of the number of channels transmitted as well as a greater speed of transmission.

DWDM increases the capacity of embedded fiber by first assigning incoming optical signals to specific frequencies (wavelengths or lambda) within a designated frequency band and then multiplexing the resulting signals out onto one fiber. DWDM combines multiple optical signals so that they can be amplified as a group and transported over a single fiber to increase capacity. Each signal carried can be at a different rate (OC-3, OC-12, OC-48, OC-192, etc.) and in a different format (SONET, ATM, data, etc.). For example, a DWDM network with a mix of SONET signals operating at OC-48 (2.5 Gbps) and OC-192 (10 Gbps) over a DWDM infrastructure can achieve capacities of over 40 Gbps.

A DWDM system can be viewed as a parallel set of optical channels, each using a slightly different light wavelength, but all sharing a single transmission medium. Several elements may have an impact on the performance of such a system, notably optical power, linear noise, non-linear distortion, mismatches between the transmitter and receiver, among others. With the evolution of the DWDM system towards more channels, narrower channel spacing and higher speed, performance monitoring and optimization of the system becomes more and more challenging.

Unfortunately, traditional system optimization methods, such as Optical Signal-to-Noise Ratio (OSNR), demonstrate various weaknesses such that they are unable to provide the necessary overall estimation of the system performance. More specifically, while OSNR has a short run time and can be applied when the system is in-service, it only considers linear noise in the system and ignores the non-linear distortion difference among the wavelength division multiplexed channels.

Another existing optimization method is the Sequential Tx Attenuation and Rx Test (START), which uses the Bit Error Ratio (BER) margin to optimize the DWDM system performance. START considers both linear and non-linear noise but is very time consuming and can only be used in the initial system tune up, as opposed to having a more practical in-service application.

The background information provided above clearly indicates that there exists a need in the industry to provide an improved method and apparatus for optimizing the performance of an optical transmission system, in particular a DWDM system.

SUMMARY OF THE INVENTION

According to a first aspect, the present invention provides a tuning system for use in a data receiver of an optical transmission system. The optical transmission system can be a DWDM system, among other possibilities. The tuning system includes a first input for observing a signal transported on a data channel of the data receiver and a second input for observing a signal transported on a monitoring channel of the data receiver. The data channel and the monitoring channel carry the same information. The data channel can be viewed as a primary data transport channel, while the monitoring channel carries a copy of the data and makes that copy available to the tuning system for analysis.

The tuning system includes a processing module that is coupled to the first and to the second inputs. Based on information received at the first and second inputs, the processing module generates a control signal conveying tuning information. The tuning information can be used by the data receiver to alter its operating point such as to enhance or improve its performance on the data channel of the data receiver.

An advantage of this approach is to allow, when required or desired, tuning of the system while the system is in service. This is possible since the tuning of the system is performed using the monitoring channel, and does not disturb nor corrupt the actual data being transported on the data channel.

In a specific example of implementation, the tuning information conveyed in the control signal allows the data receiver to alter a decision threshold used to discriminate one binary value from another binary value on the data channel. For example, the decision threshold can be a voltage value. When the signal on the data channel is above this voltage value, the data receiver will interpret the signal as one binary value (1 or 0). Conversely, when the signal on the data channel is below this voltage value, the data receiver will interpret the signal as another binary value (0 or 1).

Continuing with this example of implementation, the tuning system includes an additional output to generate another control signal for selectively altering the decision threshold applied on the copy of the data signal transported on the monitoring channel. The processing module sequentially sets the decision threshold to different positions (in terms of voltage values, this implies that the reference voltage is set to different values) such as to artificially change the bit error rate on the monitoring channel. Note that this operation is conducted only at the monitoring channel, the data on the data channel being left undisturbed.

The alteration of the decision threshold is made such as to induce in the monitoring channel two different bit error rate values, namely 1.0E-7 and 1.0E-8. Each bit error rate value is associated to two different decision thresholds. In other words, a first deviation of the decision threshold in one direction (say an increase) will result in a certain bit error rate value for the channel, and a second deviation of the decision threshold in the other direction (a decrease) will result in the same bit error rate value for the channel, where the first and second deviations may be of different sizes. Thus two different decision thresholds can yield the same absolute bit error rate.

The bit error rate can be computed by comparing the data that is artificially corrupted on the monitoring channel, by performing decision threshold variations, to the actual data transported on the data channel.

The processing module is operative to compute a Q factor for each bit error rate value. This allows the processing unit to compute four pairs of values, each pair including a Q factor and a decision threshold. Recall that under this example, each bit error rate value, and hence each Q factor, is associated to two different decision thresholds, which yields four pairs of values. By applying a linear function to the four pairs, the decision threshold that corresponds to the optimum Q factor can be extrapolated. This extrapolated decision threshold is truly for the monitoring channel since it has been established on the basis of data observed on the monitoring channel. However, the behavior of the data channel being identical or almost identical to the monitoring channel, the same decision threshold generally applies as well.

The decision threshold is then applied to the data channel by issuing a control signal associated with the data channel that conveys the new decision threshold to be applied to the data signal.

In a different aspect, the invention provides an adjustment system designed to perform Q factor tuning in a multi-channel receive unit. Each channel of the receive unit is provided with a data receiver. The Q factor of a channel can be selectively altered independent of the Q factors of the other channels. The tuning system measures, derives or assesses the Q factor for each channel and issues a control signal to selectively alter Q factors as desired.

In a specific example of implementation, the Q factor for each data receiver is obtained from the tuning system of the data receiver, that computes the Q factor, as described in general terms earlier. The adjustment system attempts to perform Q factor equalization such that the Q factor of each channel falls within a certain Q factor range. Specifically, if the Q factor for a particular channel is outside the Q factor range, the adjustment system will issue a control signal which causes alteration of the Q factor of the particular channel. For instance, the control signal may be designed to regulate the power of the data signal transported in the channel such as to alter the Q factor as desired. The power regulation can be accomplished by conveying the control signal to the transmit end of the channel where the data signal originates and where a power control mechanism can be easily implemented.

The invention also provides a method for tuning a data receive unit in an optical transmission system.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DETAILED DESCRIPTION

Figure 1:
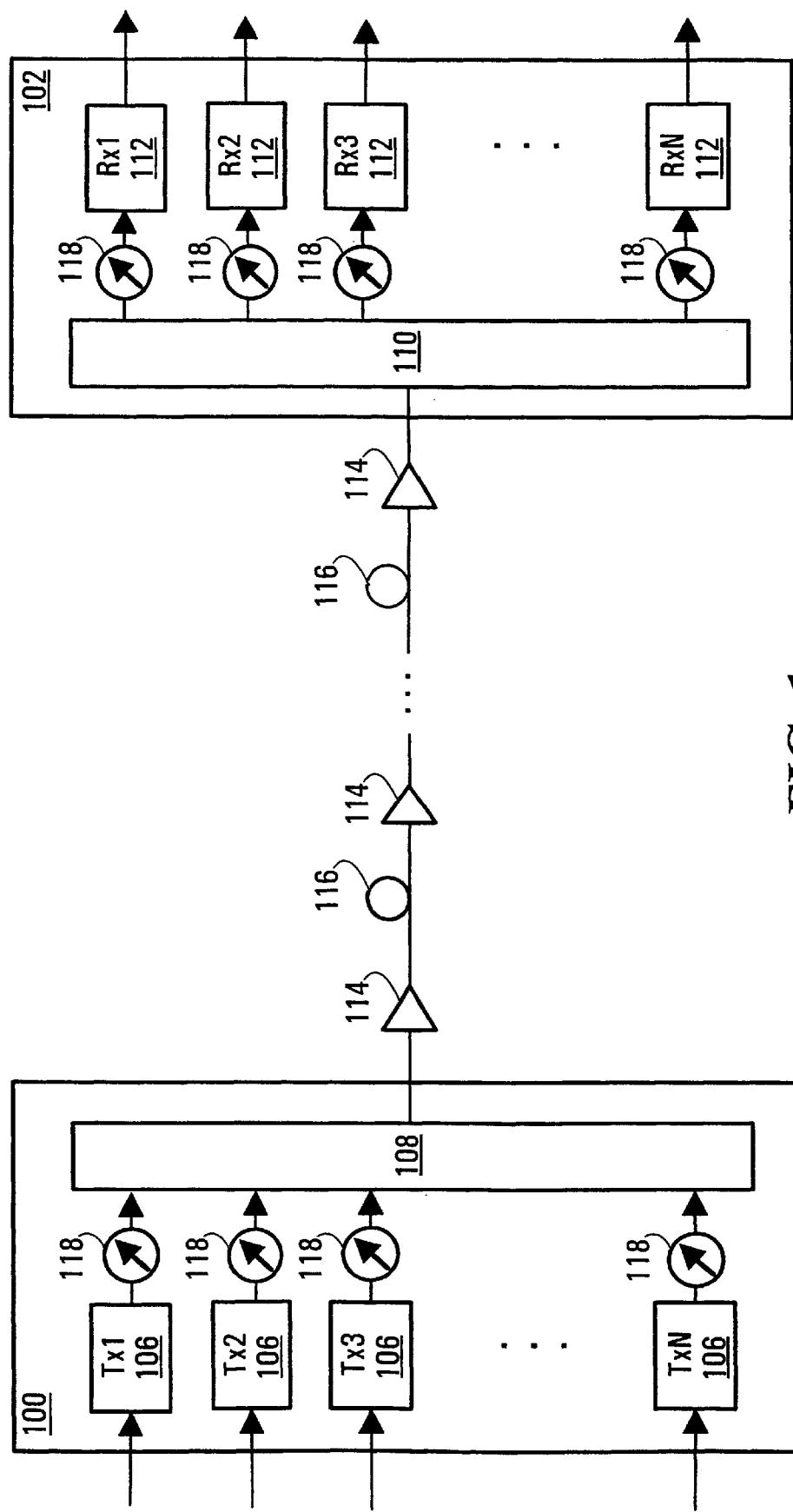
FIG. 1 is a block diagram of a DWDM system, in accordance with an example of implementation of the present invention.

FIG. 1 depicts a block diagram of a standard DWDM system, including a transmit unit 100 and a receive unit 102 connected by a fiber span 116. At the transmit unit, an incoming optical signal is assigned to one of multiple transmitters 106, specifically $T_{x1} \ldots T_{xN}$, each of the multiple transmitters 106 operating at a different specific frequency and thus over a different specific channel. The transmit unit includes a WDM multiplexer 108 operative to combine the multiple optical signals output from the transmitters 106 into a single optical signal, for transmission over the fiber span 116 towards the receive unit 102. Thus, the fiber span 116 is a common transmission medium implementing a parallel set of optical channels. In a specific example, this fiber span 116 is 100 km in length. The receive unit 102 includes a WDM demultiplexer 110 operative to process the optical signal received over the fiber span 116 in order to identify and extract therefrom the multiple optical signals travelling at different specific frequencies. Each of these optical signals is output to one of multiple receivers 112, specifically $R_{x1} \ldots R_{xN}$. At both the transmit unit 100 and the receive unit 102, optical attenuators 118 are used to control certain operating parameters of the transmitters 106 and receivers 112, respectively.

The fiber span 116 in a DWDM system includes multiple interspersed fiber amplifiers 114, responsible for amplifying signals travelling over the fiber span 116 between the transmit unit 100 and the receive unit 102. These fiber amplifiers 114 are not perfectly identical and manifest small operational differences. As is well known in the art, such discrepancies between profiles of the fiber amplifiers 114 can cause an increase of the linear noise as well as non-linear distortions in an optical signal as it travels from the transmit unit 100 to the receive unit 102. An important quantity known as the decision voltage threshold is used at the receive unit 102 to help recover and correctly interpret the optical signal data, as will be described in further detail below.

Figure 2:
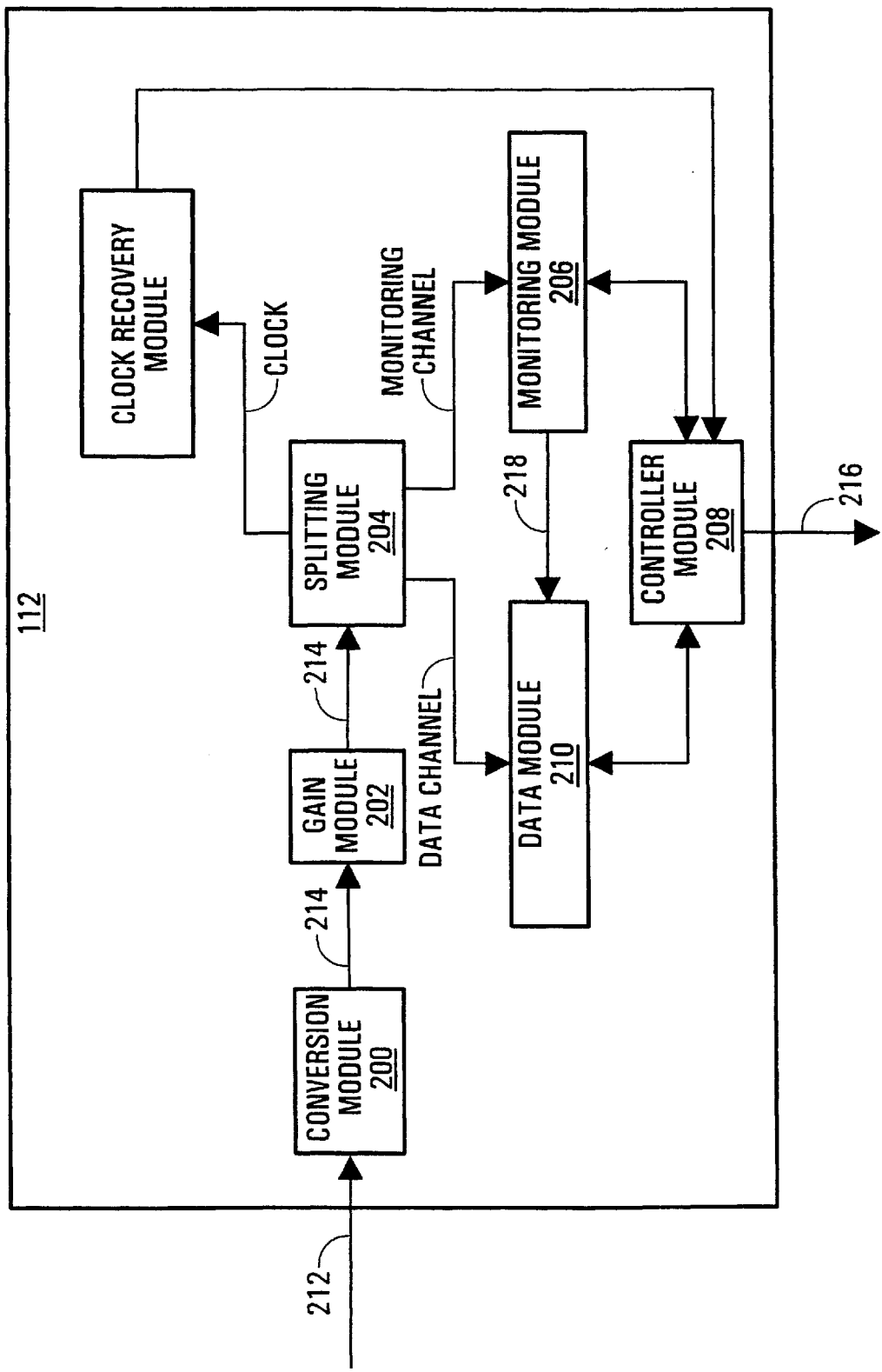
FIG. 2 is a block diagram of a receiver shown in FIG. 1.

FIG. 2 is a block diagram of a receiver 112 at the receive unit 102. The receiver 112 includes a conversion module 200, a gain module 202, a splitting module 204, a monitoring module 206, a controller module 208 and a data module 210. The conversion module 200 is responsible for converting the optical data signal received at input 212 to an electrical data signal, the latter being passed on to the splitting module 204 over link 214, via a gain module 202. The splitting module 204 is operative to split the electrical data signal received from the conversion module 200 onto two distinct channels, specifically a data channel and a monitoring channel. While the data channel can be viewed as the primary data transport channel, both the data channel and the monitoring channel carry the same information. Output 216 is a communication port from which the receiver 112 may release data.

The monitoring module 206 is responsible for performing eye tracking of the receiver 112 on the monitoring channel, where the phase and decision voltage threshold may be constantly moved in order to track the eye without interfering with data traffic. similarly, the data module 210 is responsible for performing eye tracking of the receiver 112 on the data channel, where movement of the phase and decision voltage threshold will interfere with data traffic. Eye tracking includes regular measurement of the eye contour. The eye corresponds to a particular freeze frame view of the monitoring channel, where the chosen frame remains constant as the data signal is constantly flowing across it. Given that the freeze frame view is taken repeatedly and that the data signal present in the frame at any one viewing is saved in the frame, an overlapping signal pattern develops in the shape of an eye. Since the concept of the eye in DWOM systems is well known to those skilled in the art and has been well documented, it will not be described in further detail. However, the eye contour, as revealed by continuous tracking performed by the monitoring module 206 on the monitoring channel, is an important tool for performance analysis and optimization (tuning) of the DWDM system, as will be described below For each of the data channel and the monitoring channel, the data module 210 and the monitoring module 206, respectively, use a decision threshold to discriminate one binary value from another binary value on the channel. Specific to this example of implementation, the decision threshold is a voltage value, referred to as a decision voltage value, where refM is the decision voltage threshold on the monitoring channel and refD is the decision voltage threshold on the data channel. In order to clarify the functionality of a decision voltage threshold, assume in a specific example that refD is set to −1.0 V. Thus, any data signal having a voltage higher than −1.0 V (−0.99 V and above) will be interpreted as a 1 on the data channel, while any data signal having a voltage lower than −1.0 V (−1.01 V and below) will be interpreted as a 0 on the data channel.

The monitoring module 206 is responsible for setting the decision voltage thresholds refM and refD on the monitoring channel and data channel, respectively, by generating a control signal conveying tuning information relevant to the particular channel. When setting refD, the monitoring module 206 is operative to send the control signal conveying the corresponding tuning information to the data module 210 over the path 218. In a specific example of implementation, the monitoring module 206 is implemented in firmware.

The controller module 208 is responsible for regulating the modular components at the receiver 112. Specific to the example of implementation described here, the controller module 208 is also responsible for implementing a tuning mechanism, the latter contributing to the optimization of the overall performance of the DWDM system. In a specific example of implementation, the controller module 208 includes a memory and a processor. The memory contains a program element that controls the operation of the receiver 112, in particular the tuning mechanism performed at the receiver 112. That program element is comprised of individual instructions that are executed by the processor, as will be described in detail below. Since each receiver 112 at the receive unit 102 is equipped with its own controller module 208, this tuning mechanism may be run in parallel among the plurality of receivers 112. Thus, tuning of the N channels that share the fiber span 116 is a parallel process, as opposed to a sequential process.

The monitoring module 206 and the controller module 208 together act as a single processing module for implementing a tuning system, the tuning system capable to alter the operating point of the receiver 112 such as to enhance or improve its performance on the data channel. The tuning system measures, derives or assesses parameters of the data signal transported on the monitoring channel, and generates tuning information necessary to performance optimization. Such an approach to the tuning of the receiver operating point allows, when required or desired, for tuning of the DWDM system while the DWDM system is in service.

According to a specific embodiment of the present invention, the tuning mechanism is based on the realization that a generally linear relationship exists between two operating parameters of a receiver, notably the Q factor and the decision voltage threshold, where the Q factor is the Signal-to-Noise Ratio (SNR) at the receiver. The Q factor is expressed by the following well-known equation:

$$Q = \sqrt{2} \times erf^{-1}(1 - 2 \times BER) \qquad (1)$$

where BER is the ratio of errored bits to bits sent. An optimized DWDM system is obviously one in which the Q factor, and thus the SNR at the receiver, is at its maximum value. Note that the maximum value of Q is found for the lowest value of BER. Unfortunately, a channel's BER is typically too low to get a meaningful measurement in the time required, such that an optimum Q factor can not be directly calculated through BER.

The tuning mechanism provides for the varying of the decision voltage threshold refM of the monitoring channel across a range of values, such that the BER is artificially increased or decreased. Comparing the data on the monitoring channel to the data on the data channel reveals the bit errors caused by the change in refM, and thus allows for the corresponding BER to be determined. Note that for each value of BER, two values of refM correspond thereto. Assume for example that refD is initially set to approximately −1.0 V, between the 0 V level and the −2 V level, corresponding to a BER level of $BERG_0$. When refM is increased from −1.0 V to 0 V or decreased from −1.0 V to −2.0 V, the BER level for the monitoring channel will increase similarly from $BER_0$, arriving at some point in either direction at a greater BER level of $BER_1$.

Note that since this tuning mechanism is realized by using the monitoring channel, the actual traffic flowing through the DWDM system on the data channel is not interfered with and an in-service application is possible.

Figure 3:
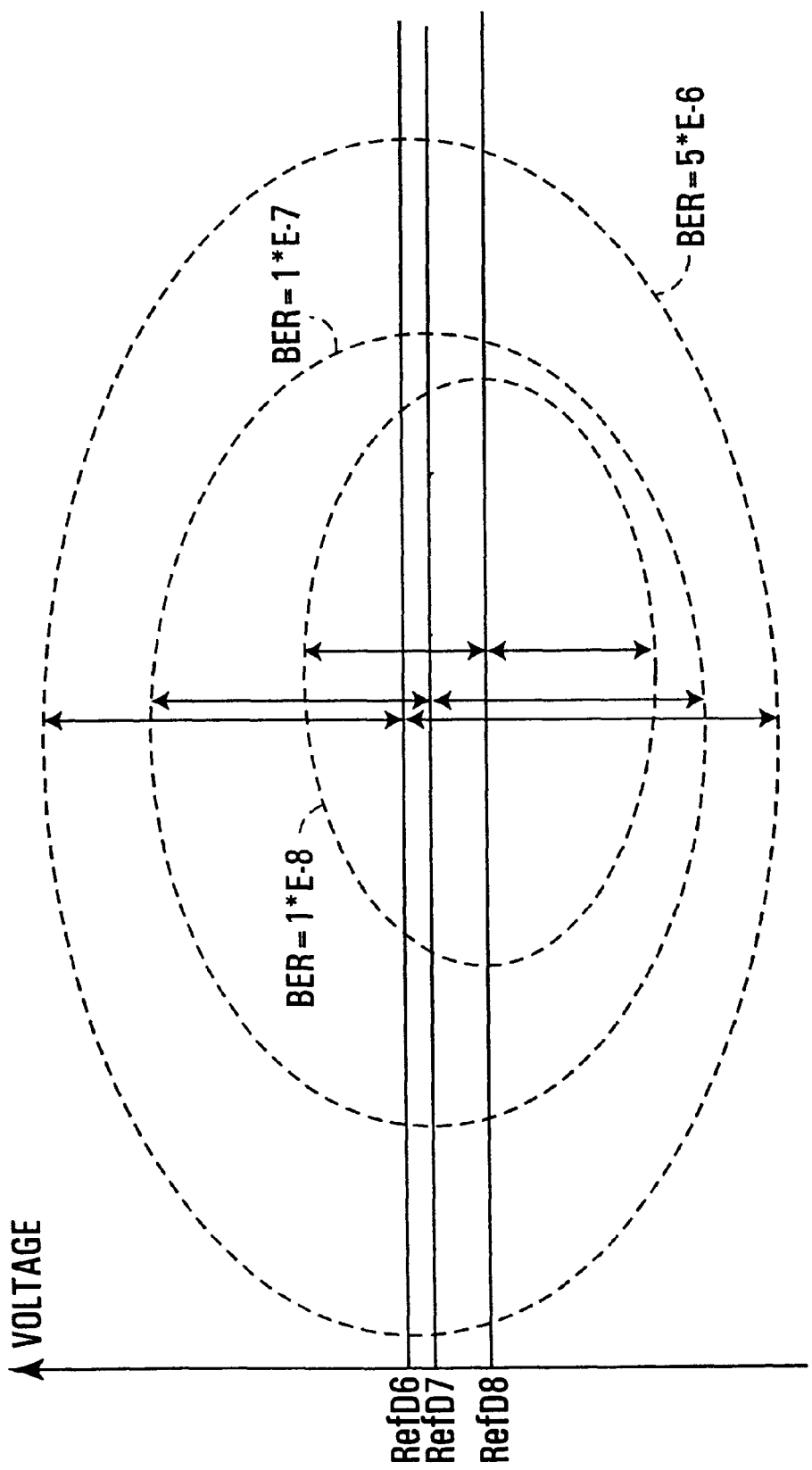
FIG. 3 illustrates the relationship between the eye profile and the BER for a channel of the DWDM system transmission medium.

As shown in FIG. 3, as the BER value for the monitoring channel decreases, the monitoring channel eye contour will also decrease. This is due to the greater amount of noise reflected by the eye at a lower BER, given the longer time of measurement required in order to reach a lower BER. As the eye contour changes, the optimum decision voltage threshold will also change accordingly, where the optimum position for the decision voltage threshold is approximately located at a ratio of 50:50 along the eye contour.

Figure 4B:
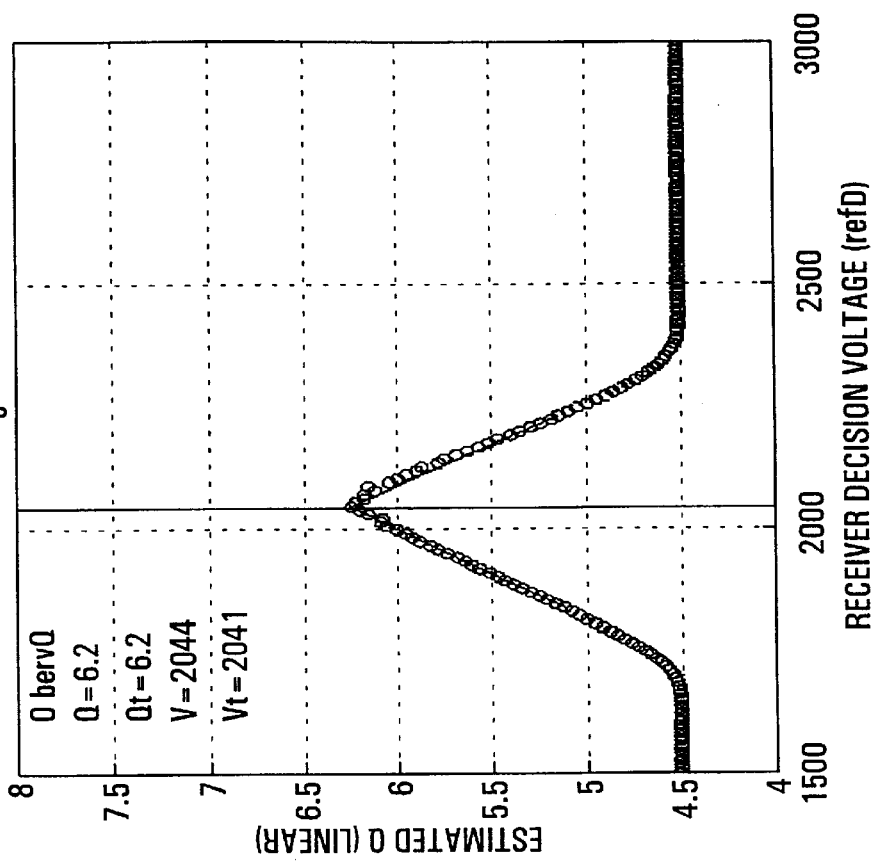
FIGS. 4A and 4B reveal an experimentally derived linear relationship between the Q factor and the decision voltage threshold.
Figure 4A:
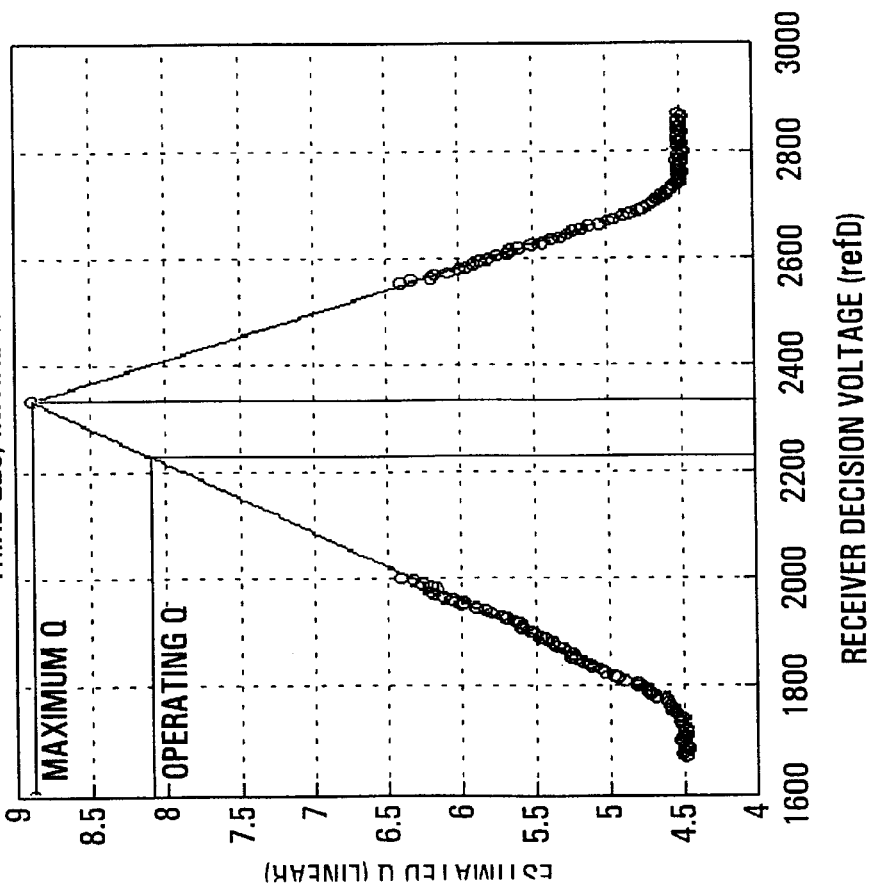

The above described "decision voltage threshold modification technique" was used experimentally in a laboratory to reveal the linear relationship between the Q factor and the decision voltage threshold, results of which are shown in FIGS. 4A and 4B. Although Q needs to be measured on the monitor channel in order to do in-service optimization, in the laboratory Q can be and was measured on the data channel.

In FIGS. 4A and 4B, each circle is a data point where the errors were collected for at least 10 seconds but no more than 30 seconds, or at least 30 errors for each value of refD on the data channel. A linear fit through the linear region of data (extrapolation) yields a peak Q representing the channel's maximum or optimum Q, and thus the channel's optimum decision voltage threshold refD.

Figure 5:
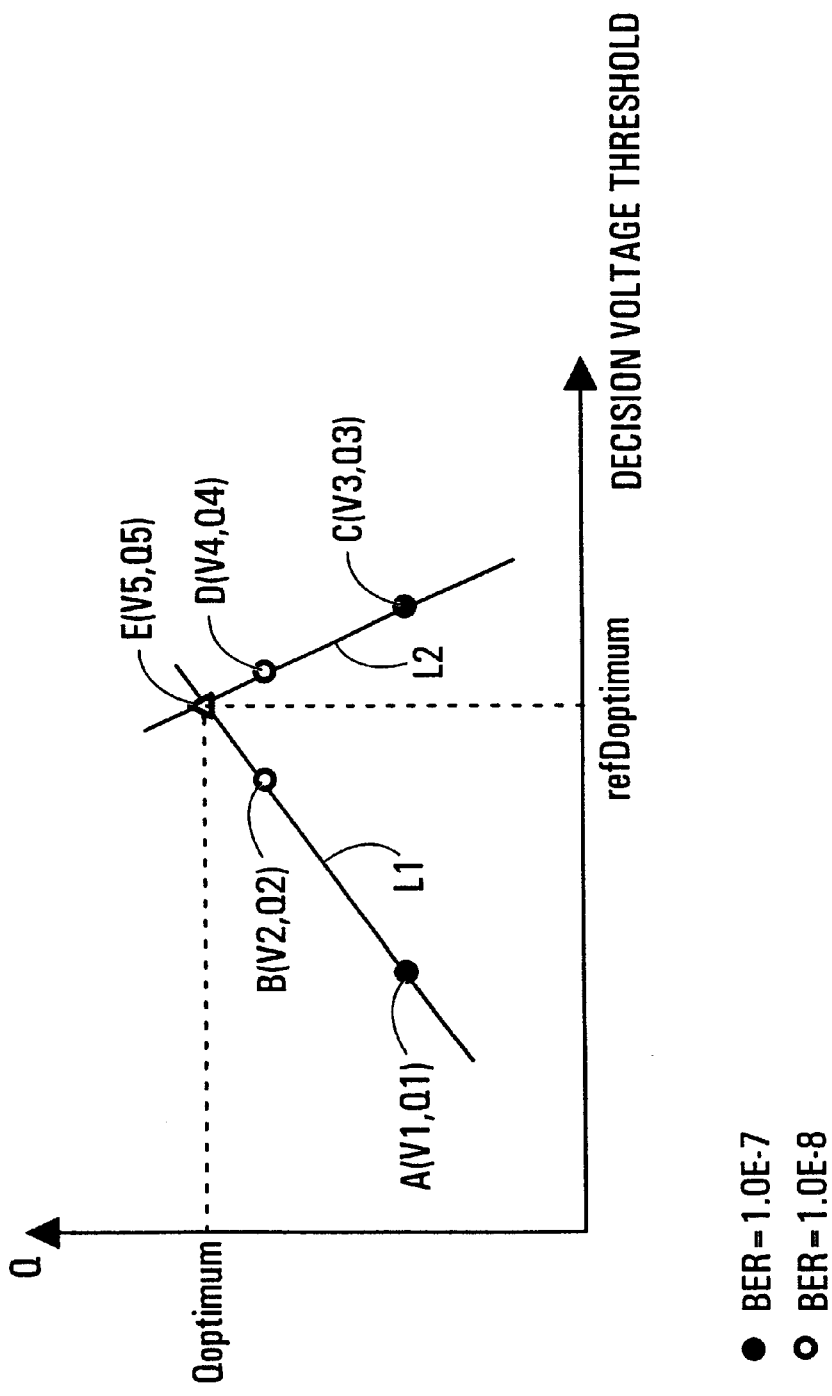
FIG. 5 represents the Q versus Decision Voltage Threshold curve for the monitoring channel.

In a specific example of implementation of the present invention, the optimum decision voltage threshold refD and the optimum Q are extrapolated from four points A(V1, Q1), B(V2, Q2), C(V3, Q3) and D(V4, Q4) of the Q versus Decision Voltage Threshold curve for the monitoring channel, as shown in FIG. 5. Points A and C represent the two values of refm (V1 for level "1" and V3 for level "0") for which a BER of 1.0E-7 is measured on the monitoring channel, and the corresponding Q values (Q1 and Q3). Points B and D represent the two values of refM (V2 for level "1" and V4 for level "0") for which a BER of 1.0E-8 is measured on the monitoring channel, and the corresponding Q values (Q2 and Q4). Note that Q1, Q2, Q3 and Q4 are predetermined values, where Q1=Q3=5.2 and Q2=Q4=5.61, calculated using the above equation (1) on the basis of their respective associated BER. Given these four points, line L1, extrapolated from points A and B, and line L2, extrapolated from points C and D, will intersect at a point E(V5, Q5), where V5 is the optimum decision voltage threshold refD and Q5 is the optimum Q factor value. The extrapolation of the lines L1 and L2 is based on the well-known mathematical formula $y=mx+b$, and yields the intersection point E(V5, Q5) as follows:

$$V5 = [(V1*V4) - (V3*V2)] / [(V1 - V3) - (V2 - V4)] \quad (2)$$

$$Q5 = [Q1 + ((Q2 - Q1)*(V5 - V1)/(V2 - V1))] \quad (3)$$
$$= [Q1 + ((Q2 - Q1)*(V5 - V3)/(V4 - V3))]$$

It is important to note that associated with each BER measurement is an uncertainty measurement. This uncertainty measurement translates directly into an uncertainty measurement for each of points A, B, C and D, which in turn translate into an extrapolation error. This extrapolation error contributes to the Q stability. The four points A, B, C and D correspond to two eye contours in the linear region of the Q versus Decision Voltage Threshold curve. As seen in FIGS. 4A and 4B, the data curve tails off at about Q=4.5, forming a saturation region, where a point in the saturation region can not be used to perform extrapolation. The choice of using the first eye contour at BER=1.0E-8 is based on current technology that has shown BER=1.0E-8 as being the lowest BER measurable within an acceptable period of time. The choice of using the second eye contour at BER=1.0E-7 is based on experimental results performed to date, which reveal that the use of this second eye contour gives the smallest extrapolation error. Note that these values are only practical choices and that the first eye contour can be set at different BER values without departing from the spirit of the invention.

In a specific example of implementation of the present invention, the firmware monitoring module 206 is constantly tracking the eye on the monitoring channel and, as per existing DWDM system implementations, measuring the eye profile at a BER of 5.0E-6. In addition, the monitoring module 206 is regularly measuring the eye profile at a BER of 1.0E-8 as well as at a BER of 1.0E-7 and, for each of these profiles, taking the measurements necessary to determine the optimum decision voltage threshold refD and optimum Q factor for the data channel. Specifically, the algorithm used by the firmware is as follows:

1. Measure the eye contour at BER=5.0E-6 and set refD at the 57:43 ratio of the eye contour.
2. Monitor the receiver 112 optical power. If there is no change in the power level, proceed to step 3, else go back to step 1.
3. Measure the eye contour at BER=1.0E-7 and set refD at the 57:43 ratio of the eye contour.
4. Save the decision voltage threshold refM value of the largest eye opening at BER=1.0E-7, for both the upper side (moving towards 0 V level) and lower side (moving towards –2.0 V level), corresponding to voltages V1 and V3, respectively.
5. Monitor the receiver 112 optical power. If there is no change in the power level, proceed to step 6, else go back to step 1.
6. Measure the eye contour at BER=5.0 E-6.
7. Measure the eye contour at BER=1.0 E-8 and set refD at the optimum point for the eye contour.
8. Save the decision voltage threshold refM value of the largest eye opening at BER1.0E-8, for both the upper side (moving towards 1V level) and lower side (moving towards 0V level), corresponding to voltages V2 and V4, respectively.
9. Monitor the receiver 112 optical power. If there is no change in the power level, go back to step 4, else go back to step 1.

Once the monitoring module 206 has taken the necessary measurements, it sends a Voltage_data signal to the controller module 208. In a specific example, the Voltage_data signal is sent on the order of once every second. The Voltage_data signal includes a voltage string V=[V1 V2 V3 V4 Vref], where Vref is the decision voltage threshold value refD set by the monitoring module at step 7 of the above algorithm. The Voltage_data signal is used by the controller module 208 to perform the tuning mechanism, as will be described below.

Figure 6:
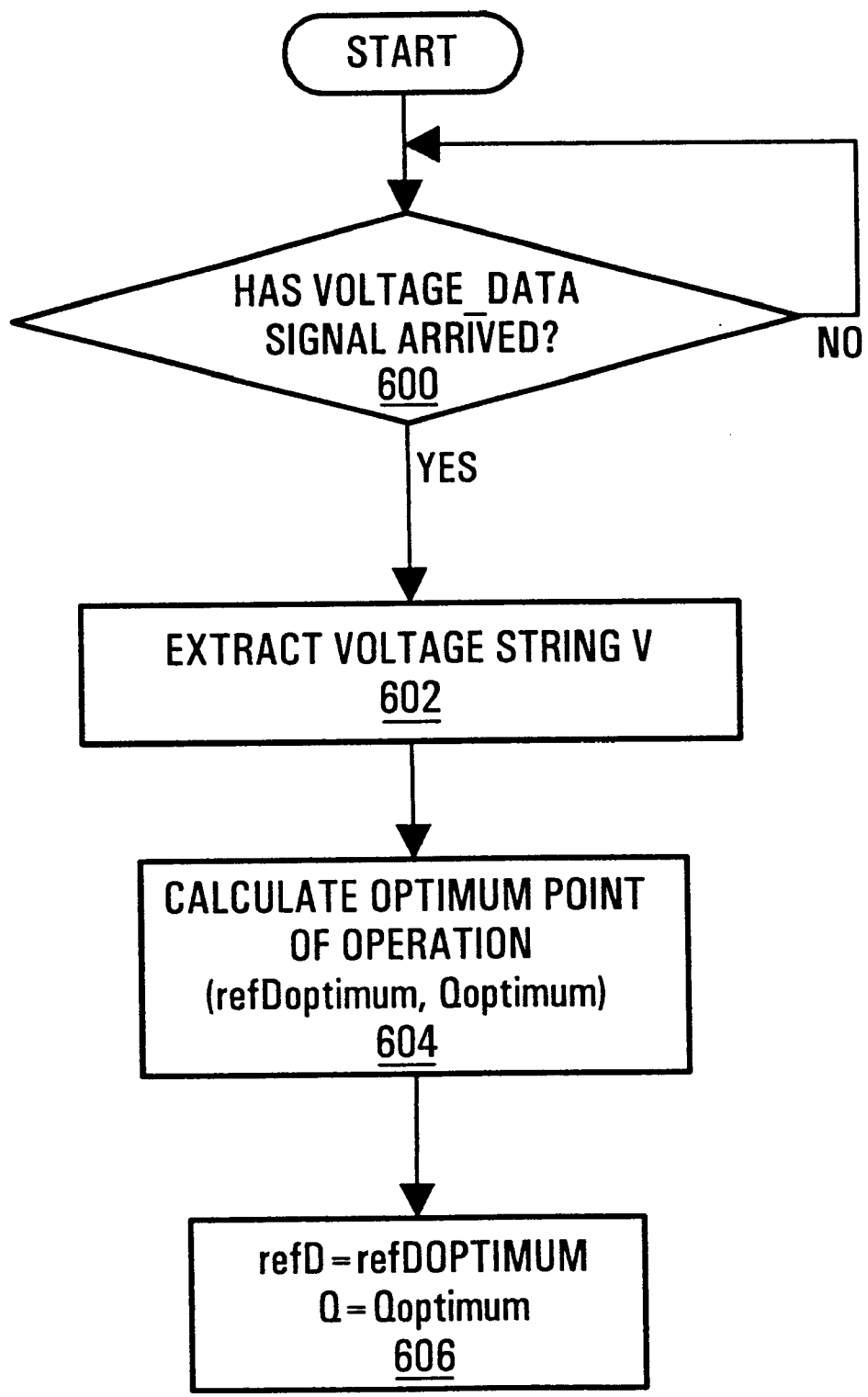
FIG. 6 is a flowchart illustrating the operation of a program element in the receiver shown in FIG. 2, which controls the tuning mechanism.

FIG. 6 provides a complete flowchart illustrating an example of the operation of the program element stored in the memory of the controller module 208, and executed by the processor, that regulates the operation of the receiver 112 for one channel of the fiber span, in particular the tuning mechanism. At step 600, the controller module 208 waits for the arrival of the Voltage_data signal from the monitoring module 206. Once the Voltage_data signal arrives, the voltage string V is extracted from the control signal at step 602. At step 604, the optimum point of operation for the receiver 112 is calculated by way of the above equations (2) and (3). Specifically, the optimum decision voltage threshold refD (V5) and the optimum Q factor (Q5) are calculated using the voltages V1, V2, V3 and V4 from the voltage string V, as well as the predetermined values of Q1, Q2, Q3 and Q4. Note that the controller module 208 assumes that there has been no change in the eye contours at both BER=1.0E-8 and BER=1.0E-7, such that the system is in a stable state. At step 606, the current values of refD and Q for the receiver 112 are replaced by the new optimum refD and optimum Q values.

Since Q is a statistical variable, averaging over time may decrease the extrapolation error. In an alternative example of operation of the program element stored in the memory of the controller module 208, the controller module 208 counts the Voltage_data signals arriving from the monitoring module 206 and, for each new Voltage_data signal, stores the corresponding voltages V1, V2, V3 and V4 in memory. The controller module 208 is operative to average the most recent N consecutive voltage measurements, specifically $V1_1 \ldots V1_N$, $V2_1 \ldots V2_N$, $V3_1 \ldots, V3_N$ and $V4_1 \ldots, V4_N$, in order to obtain average values $V1_{avg}$, $V2_{avg}$, $V3_{avg}$, and $V4_{avg}$. These four average values are then used to calculate the average optimum point measurements, $refD_{avg}$ ($V5_{avg}$) and $Q_{avg}$ ($Q5_{avg}$) as per equations (2) and (3) given above, which replace the current values of refD and Q for the receiver 112.

Figure 7:
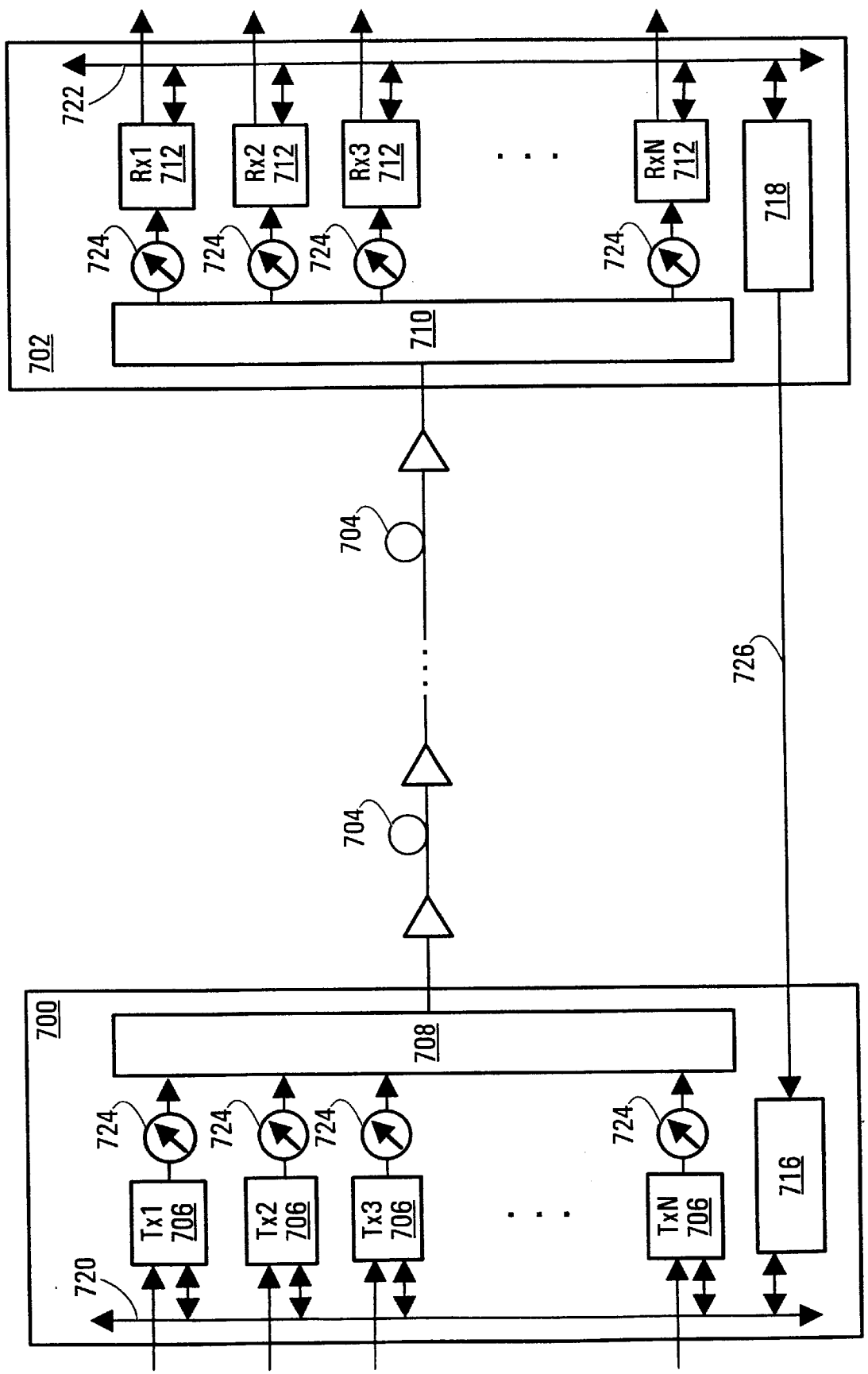
FIG. 7 is a block diagram of a DWDM system, in accordance with a second example of implementation of the present invention.

Note that in certain cases, the eye profile may be immeasurable by the monitoring module 206, in which case extrapolation by the controller module 208 will be impossible due to an insufficient number of data points. This situation may arise when a channel of the fiber span fails. Alternatively, it is possible that at BER≧1.0E-8 the eye will have closed, causing the monitoring module 206 to scan through the entire range of decision voltage thresholds without detecting the particular eye profile at BER=1.0E-8. In either case, it is necessary for the monitoring module 206 to alert the controller module 208 that channel failure or eye closure has occurred. In a specific example, the monitoring module 206 will send to the controller module 208 a Voltage_data signal comprising a voltage string of all 0s, representative of an eye closure indicator. In the situation where eye closure has occurred at BER=1.0E-8, the controller module 208 has recourse to a system level register of the receiver 112, commonly known as the Receiver Over Head Processor (ROHP), which is constantly verifying and storing operating parameters for the receiver 112. The ROHP is a well-known component of a SONET DWDM receiver, and as such was not shown in FIG. 2 and will not be described in further detail. The BER is read from the ROHP and used to calculate the optimum Q factor for the receiver 112. In a particular example, if the optimum Q is lower than 5.61 but higher than 5.20, the optimum decision voltage threshold refD for the receiver 112 will be taken as the 57:43 ratio of the 1.0E-7 eye contour. If the optimum Q is lower than 5.20, at which point the eye contour at BER=1.0E-7 is closed, the optimum decision voltage threshold refD for the receiver 112 will be taken as the 57:43 ratio of the 5.0E-6 eye contour In another example of implementation of the present invention, as shown in FIG. 7, both the transmit unit 700 and the receive unit 702 include a control module 716, 718, respectively, and a system bus 720, 722, respectively. The control module 718 at the receive unit 702 acts as an adjustment system and includes a memory and a processor. The adjustment system is responsible for implementing a Q factor adjustment mechanism for equalizing the DWDM system performance, as will be described in detail below. The memory contains a program element comprised of individual instructions that are executed by the processor. The system bus 722 at the receive unit 702 allows for the transfer of messages between the different components of the receive unit 702, specifically between the controller modules of the receivers 712 and the control module 718. Similarly, the system bus 720 at the transmit unit 700 allows for the transfer of messages between the different components of the transmit unit 700. Specific to this example of implementation, a feedback path 726 exists between the control module 718 of the receive unit 702 and the control module 716 of the transmit unit 700.

As described above, each receiver 712 controller module is associated with a particular data channel of the fiber span 704 and is operative to implement a tuning mechanism in order to determine the optimum operating point for the receiver 712. Specifically, this optimum operating point includes an optimum Q factor for the data channel. In a specific example, the control module 718 sends a Q_request signal to the plurality of receivers 712 via the system bus 722, as a request for identification of the Q value for each channel. Each receiver 712 will then send a Q_data signal to the control module 712 via the system bus 722. The Q_data signal includes an identification of the particular receiver 712, as well as the current Q value for the particular receiver 712. Thus, the control module 718 regularly collects and stores the Q values for each of the fiber span 704 channels, also referred to as Q_ch1, Q_ch2, . . . , Q_chN.

In a specific example, the Q factor adjustment mechanism implemented by the control module 718 at the receive unit 702 attempts to equalize the spectrum of Q factor values Q_ch1, Q_ch2, . . . , Q_chN, by controlling the transmission power of the corresponding transmitters 706 at the transmit unit 700 such that each Q value falls within a certain Q factor range. Thus, the control module 718 identifies $Q_{min}$, the minimum Q value among Q_ch1, Q_ch2, Q_chN, $Q_{max}$, the maximum Q value among Q_ch1, Q_ch2, . . . , Q_chN, and $Q_{avg}$, the average Q value for Q_ch1, Q_ch2, . . . , Q_chN. On the basis of $Q_{min}$, $Q_{max}$ and $Q_{avg}$, the control module 718 determines for each channel i=[1,N] whether or not a transmission power adjustment $adj_i$ is required at the transmitter 706 for channel i. In the case where a transmission power adjustment is required, the control module 718 will generate a transmit_control signal and send this signal to the transmit unit 700 over the feedback path 726. The transmit_control signal includes at least one transmitter identifier, as well as, for each transmitter identifier, an associated power adjustment value. The control module 716 at the transmit unit 700 is operative to process the transmit_control signal and adjust accordingly the transmit power level for one or more of the transmitters 706.

Figure 8:
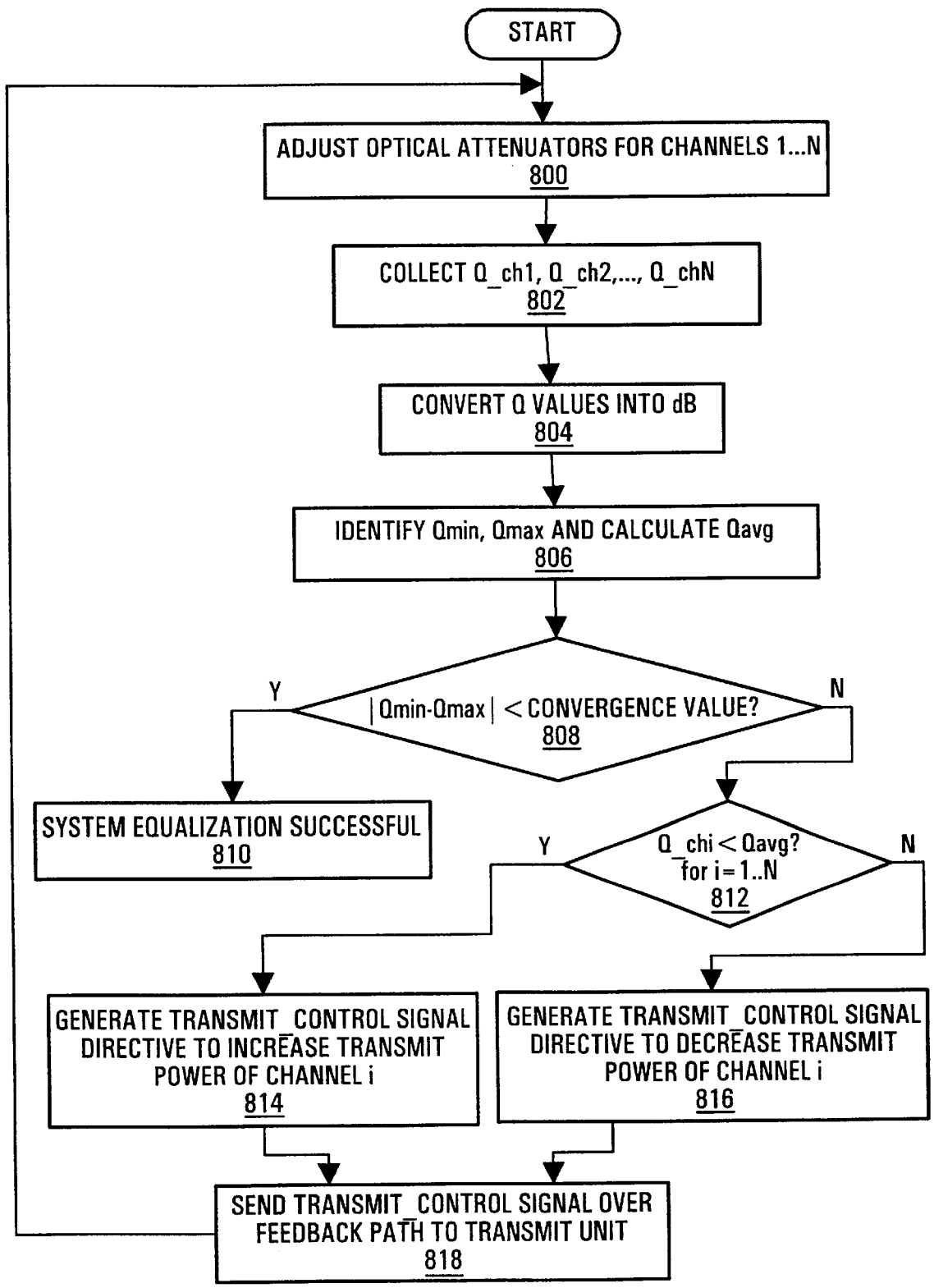
FIG. 8 is a flowchart illustrating the operation of a program element in the receive unit shown in FIG. 8, which controls the Q factor adjustment mechanism.

FIG. 8 provides a complete flowchart illustrating an example of the operation of the program element stored in the memory of the control module 718 at the receive unit 702, and executed by the processor, that regulates the operation of the receive unit 702, in particular the Q factor adjustment mechanism. At step 800, the optical attenuator 724 for each receiver 712 is adjusted such that the Q value for the respective DWDM channel is maximised. At step 802, the Q values among all of the DWDM channels are simultaneously collected, specifically Q_ch1, Q_ch2, . . . , Q_chN. These values are converted into dB at step 804. At step 806, the minimum value $Q_{min}$ and the maximum value $Q_{max}$ among Q_ch1, Q_ch2, . . . , Q_chN are identified, and the average value $Q_{avg}$, is calculated. These values are stored in the memory of the control module 718. At step 808, if the absolute difference between $Q_{min}$ and $Q_{max}$ is less than a predetermined convergence value, in a specific example 0.5 dB, the system is qualified as being equalized and the equalization mechanism is successful at step 810. If the absolute difference between $Q_{min}$ and $Q_{max}$ is greater than the predetermined convergence value, the DWDM system requires equalization. At step 812, each of the Q values Q_ch1, Q_ch2, . . . , Q_chN is compared to $Q_{avg}$. If the Q value for a particular channel i is less than $Q_{avg}$, the control module 718 at the receive unit 702 generates a transmit_control signal directive to increase the transmit power for channel i at step 814. If the Q value for channel i is greater than $Q_{avg}$, the control module 718 at the receive unit 702 generates a transmit_control signal directive to decrease the transmit power for channel i at step 816. Note that a single transmit_control signal may include multiple transmit power adjustments, each transmit power adjustment being associated with a particular transmitter or channel identifier. At step 818, the control module 718 sends the transmit_ control signal to the transmit unit 700 over the feedback path 726. The program next jumps back to step 800, such that the algorithm is repeated if Q equalization for the DWDM system has not yet been achieved.

As described above, the Q versus BER relationship is given by the error function:

$$Q = \sqrt{2} \times erf^{-1}(1-2 \times BER) \quad (1)$$

Alternatively, a simpler approximation formula may be used as a substitute error function within the Q range of 3.7 to 6.5 (linear), specifically:

$$Q_{approx} = -0.0172 \times [\log 10(BER)]^2 - 0.679 \times \log 10(BER) + 1.3031 \quad (4)$$

Figure 9:
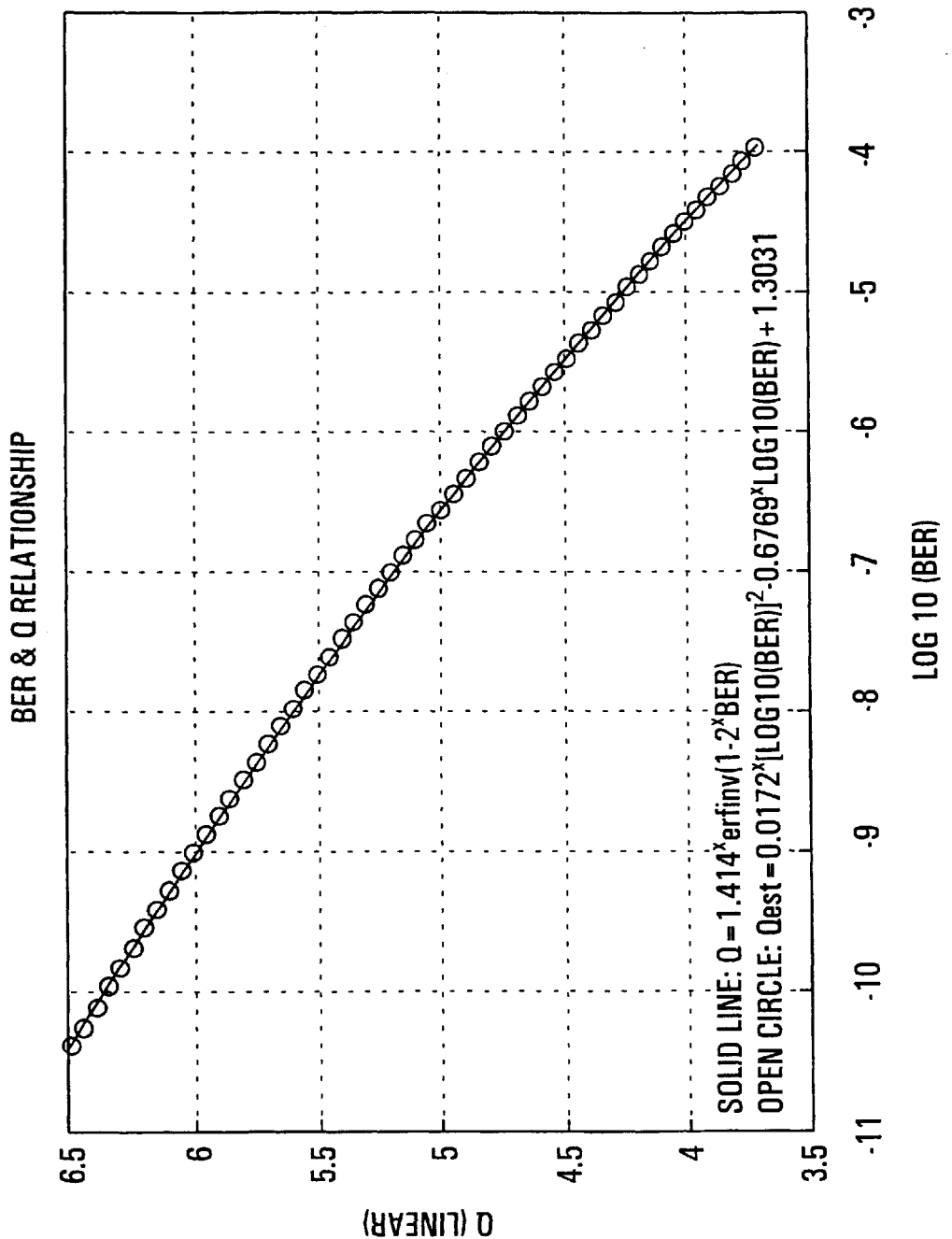
FIG. 9 reveals the accuracy of an approximation formula for the Q versus BER relationship.

As shown in FIG. 9, the approximation formula provides a good approximation of the error function. The maximum error $(Q-Q_{approx})$ of the approximation is found to be 0.0187 within the Q range of 3.7 to 6.5 (linear) or the BER range of 1.08E-4 to 4.02E-11. In the log scale, the maximum Q error given by the approximation formula (4) is less than 0.02 dB over the Q range of 3.7 to 6.5 (linear). Note that this approximation formula is used when eye closure occurs, such that extrapolation can not be performed due to an insufficient number of data points, and the optimum Q factor is to be calculated using the BER read from the ROHP, as described above.

The above description of a preferred embodiment under the present invention should not be read in a limitative manner as refinements and variations are possible without departing from the spirit of the invention. The scope of the invention is defined in the appended claims and their equivalents.

We claim:

1. A tuning system for use in a receiver of an optical transmission system, the receiver including a data channel transporting a data signal and a monitoring channel transporting a copy of the data signal, the receiver applying a first decision threshold on the data signal transported on the data channel and a second decision threshold on the copy of the data signal transported on the monitoring channel in order to discriminate one binary value from another on the respective channel, each of the data and monitoring channels being characterized by a respective bit error rate, said tuning system including:

a first input for receiving the data signal transported on the data channel;

a second input for receiving the copy of the data signal transported on the monitoring channel;

a processing module coupled to said first and second inputs for processing the copy of the data signal, said processing module operative to:

a) vary the second decision threshold of the receiver across a range of predetermined values in order to alter the bit error rate of the monitoring channel;

b) for different values of the second decision threshold of the receiver, measure the corresponding bit error rate of the monitoring channel;

c) for certain predetermined bit error rate values of the monitoring channel, identify the corresponding second decision threshold values;

d) compute for each predetermined bit error rate value and corresponding second decision threshold value of the monitoring channel an associated Q factor;

e) utilize the second decision threshold values corresponding to the certain predetermined bit error rate values and the associated Q factors of the monitoring channel to compute an optimum value for the first decision threshold of the receiver;

f) set the first decision threshold of the receiver to the computed optimum value.

2. A tuning system as defined in claim 1, wherein said processing module is operative to generate first and second control signals conveying tuning information, said tuning system including first and second outputs coupled to said processing module for releasing said first and second control signals respectively, said first control signal being operative to alter the first decision threshold of the receiver, said second control signal being operative to alter the second decision threshold of the receiver.

3. A tuning system as defined in claim 2, wherein said processing module measures the bit error rate of the monitoring channel by comparing the data on the monitoring channel received at said second input to the data on the data channel received at said first input.

4. A tuning system as defined in claim 3, wherein said processing module is operative to apply a linear function between the second decision threshold values corresponding to the certain predetermined bit error rates and the associated Q factors of the monitoring channel in order to compute the optimum value of the first decision threshold of the receiver.

5. A tuning system as defined in claim 4, wherein said processing module is operative to identify first, second, third and fourth values for the second decision threshold of the receiver, said first and third values setting the bit error rate of the monitoring channel to a value of 1.0E-7, said second and fourth values setting the bit error rate of the monitoring channel to a value of 1.0E-8.

6. A tuning system as defined in claim 5, wherein said processing module is operative to use the first, second, third and fourth values of the second decision threshold and their associated Q factors, to compute the optimum value for the first decision threshold of the receiver.

7. A tuning system as defined in claim 6, wherein an approximation formula is used to calculate the Q factor within the Q factor range of 3.7 to 6.5, the approximation formula defined as:

$$Q_{approx} = -0.0172 \times [\log 10(BER)]^2 - 0.6769 \times \log 10(BER) + 1.3031.$$

8. A tuning system as defined in claim 3, wherein each predetermined bit error rate of the monitoring channel is associated with two different second decision threshold values.

9. An adjustment system for use in a multi-channel receive unit including a plurality of receivers, each receiver being associated with a particular channel, each receiver including a tuning system as defined in claim 2, said adjustment system comprising:

an input for receiving from each receiver the Q factor value of the associated channel;

a control module coupled to said input to process the Q factors of the different channels and issue a third control signal operative to cause alteration of the Q factor value of at least one channel;

an output for releasing said third control signal from the receive unit.

10. An adjustment system as defined in claim 9, wherein said control module is operative to process the Q factors of the different channels such that each Q factor falls within a certain Q factor range.

11. An adjustment system as defined in claim 10, wherein if the Q factor for a particular channel is outside the Q factor range, said control module issues said third control signal operative to cause alteration of the Q factor of the particular channel.

12. An adjustment system as defined in claim 9, wherein said third control signal is designed to regulate the power of a data signal transported in the particular channel for altering the Q factor of the particular channel.

13. An adjustment system as defined in claim 12, wherein the particular channel includes a transmit end where the data signal transported in the particular channel originates, said transmit end implementing a power control mechanism operative to regulate the power of the data signal transported in the particular channel.

14. An adjustment system as defined in claim 13, wherein said adjustment system is operative to send said third control signal to the transmit end of the particular channel, said third control signal causing the power control mechanism at the transmit end to regulate the power of the data signal transported in the particular channel for altering the Q factor of the particular channel.

15. A method for tuning a receiver in an optical transmission system, the receiver including a data channel transporting a data signal and a monitoring channel transporting a copy of the data signal, the receiver applying a first decision threshold on the data signal transported on the data channel and a second decision threshold on the copy of the data signal transported on the monitoring channel in order to discriminate one binary value from another on the respective channel, each of the data and monitoring channels being characterized by a respective bit error rate, said method comprising:

varying the second decision threshold of the receiver across a range of predetermined values in order to alter the bit error rate of the monitoring channel;

for different values of the second decision threshold of the receiver, measuring the corresponding bit error rate of the monitoring channel;

for certain predetermined bit error rate values of the monitoring channel, identifying the corresponding second decision threshold values;

computing for each predetermined bit error rate value and corresponding second decision threshold value of the monitoring channel an associated Q factor;

utilizing the second decision threshold values corresponding to the certain predetermined bit error rate values and the associated Q factors of the monitoring channel to compute an optimum value for the first decision threshold of the receiver;

setting the first decision threshold of the receiver to the computed optimum value.

16. A method as defined in claim 15, further including the step of generating first and second control signals conveying tuning information, said first control signal being operative to alter the first decision threshold, said second control signal being operative to alter the second decision threshold.

17. A method as defined in claim 16, wherein the bit error rate on the monitoring channel is measured by comparing the data on the monitoring channel to the data on the data channel.

18. A method as defined in claim 17, said method comprising the step of applying a linear function between the second decision threshold values corresponding to the certain predetermined bit error rates and the associated Q factors of the monitoring channel, in order to compute the optimum value of the first decision threshold of the receiver.

19. A method as defined in claim 17, wherein each predetermined bit error rate of the monitoring channel is associated with two different second decision threshold values.

20. A tuning system for use in a receiver of an optical transmission system, the receiver including a data channel transporting a data signal and a monitoring channel transporting a copy of the data signal, the receiver applying a first decision threshold on the data signal transported on the data channel and a second decision threshold on the copy of the data signal transported on the monitoring channel in order to discriminate one binary value from another on the respective channel, each of the data and monitoring channels being characterized by a respective bit error rate, said tuning system including:

first input means for receiving the data signal transported on the data channel;

second input means for receiving a the copy of the data signal transported on the monitoring channel;

processing means coupled to said first and second input means for processing the copy of the data signal, said processing means operative to:
a) vary the second decision threshold of the receiver across a range of predetermined values in order to alter the bit error rate of the monitoring channel;
b) for different values of the second decision threshold of the receiver, measure the corresponding bit error rate of the monitoring channel;
c) for certain predetermined bit error rate values of the monitoring channel, identify the corresponding second decision threshold values;
d) compute for each predetermined bit error rate value and corresponding second decision threshold value of the monitoring channel an associated Q factor;
e) utilize the second decision threshold values corresponding to the certain predetermined bit error rate values and the associated Q factors of the monitoring channel to compute an optimum value for the first decision threshold of the receiver;
f) set the first decision threshold of the receiver to the computed optimum value.

21. A tuning system for use in a receiver of an optical transmission system, the receiver including a data channel transporting a data signal and a monitoring channel transporting a copy of the data signal, the receiver applying a first decision threshold on the data signal transported on the data channel and a second decision threshold on the copy of the data signal transported on the monitoring channel in order to discriminate one binary value from another on the respective channel, each of the data and monitoring channels being characterized by a respective bit error rate, said tuning system including:

a first input for receiving the data signal transported on the data channel;

a second input for receiving the copy of the data signal transported on the monitoring channel;

a processing module coupled to said first and second inputs for processing the copy of the data signal, said processing module operative to:
a) vary the second decision threshold of the receiver across a range of predetermined values in order to alter the bit error rate of the monitoring channel;
b) for different values of the second decision threshold of the receiver, measure the corresponding bit error rate of the monitoring channel;
c) for two predetermined bit error rate values of the monitoring channel, identify four corresponding second decision threshold values;
d) compute for each predetermined bit error rate value and pair of corresponding second decision threshold values of the monitoring channel a pair of associated Q factors;
e) utilize the four second decision threshold values corresponding to the two predetermined bit error rate values and the four associated Q factors of the monitoring channel to compute an optimum value for the first decision threshold of the receiver;
f) set the first decision threshold of the receiver to the computed optimum value.

* * * * *